May 19, 1925.  1,538,748
E. H. ROSENBLAD
OIL GAUGE
Filed Sept. 9, 1922
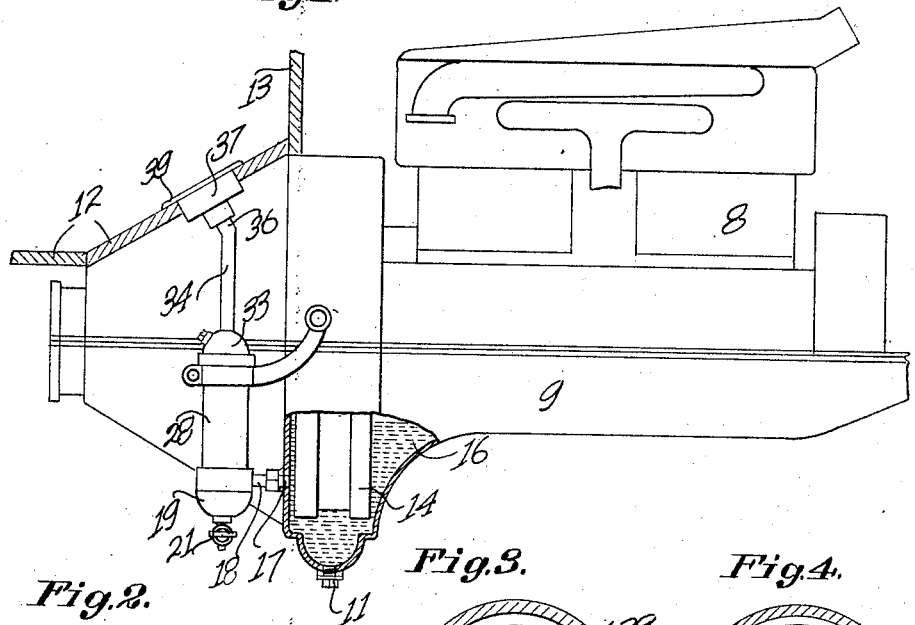
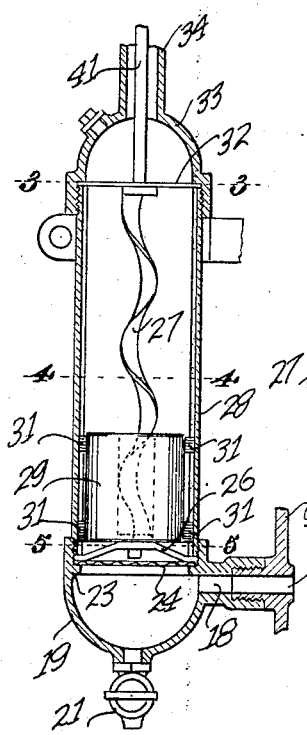
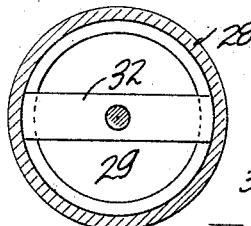
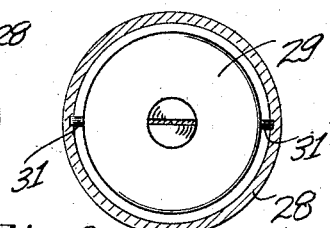
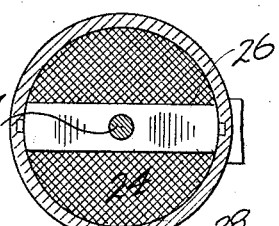
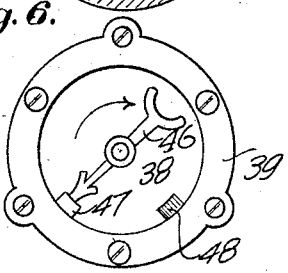
Inventor.
E. H. Rosenblad
By Victor J. Evans
Attorney.

Patented May 19, 1925.

1,538,748

UNITED STATES PATENT OFFICE.

EDWIN HAROLD ROSENBLAD, OF SAN FRANCISCO, CALIFORNIA.

OIL GAUGE.

Application filed September 9, 1922. Serial No. 587,115.

*To all whom it may concern:*

Be it known that I, EDWIN HAROLD ROSENBLAD, a citizen of the United States, residing at San Francisco, in the county of San Francisco and State of California, have invented new and useful Improvements in Oil Gauges, of which the following is a specification.

This invention relates to improvements in oil gauges, the principal object of which is to provide an oil gauge which may be attached to a crank case of an engine and one wherein the indicating mechanism is visible to the operator of the engine.

Another object is to provide a device of this character which is extremely simple and one which may be attached to any car now on the market without altering the construction thereof.

A further object is to provide a device of this character which is economical to manufacture and consequently well within the purchase price of the average automobile owner, durable and highly efficient in use.

Other objects and advantages will be apparent during the course of the following description.

In the accompanying drawings forming a part of this specification, and in which like numerals are employed to designate like parts throughout the same,—

Figure 1 is a diagrammatic side elevation of an automobile engine having my device applied thereto, Figure 2 is a vertical cross-section of my device showing the parts in operative relation, Figure 3 is a cross-section taken on the line 3—3 of Figure 2, Figure 4 is a cross-section taken on the line 4—4 of Figure 2, Figure 5 is a cross-section taken on the line 5—5 of Figure 2, Figure 6 is a plan view of the indicating dial, and Figure 7 is an enlarged detail cross-section of the indicating dial.

In certain makes of automobile no means is provided for indicating upon the dash board the fact that the car has sufficient oil in the crank case, and consequently, it is necessary for the operator of the car to either look under the car at the crank case gauge or to lift the hood in order to view the gauge placed therebeneath. Some types of automobiles are provided with the drip indicator, which indicators however, do not indicate the quantity of oil but merely the fact that the oil is flowing. I propose to overcome these objections to the present day gauges and have devised a construction whereby the operator can view the gauge from his seat in the car by placing a gauge in the floor board of the car, which gauge will indicate the quantity of oil in the crank case and thus give the operator sufficient warning so that he can refill before the oil is completely exhausted.

In the accompanying drawings wherein for the purpose of illustration is shown a preferred embodiment of my invention, the numeral 8 designates an automobile engine as a whole having a crank case 9 with the usual draw plug 11. At 12, I have shown the usual floor boards of the car, while at 13, I have shown a conventional dash board. The numeral 14 represents the fly wheel of the engine which dips in the oil supply 16. A port 17 is provided, which port is common to most makes of cars, and it is to this port that the usual petcock is attached. I propose to remove this petcock and secure thereto a pipe 18 which terminates in a bowl-shaped casting 19 in the bottom of which is secured a petcock 21. An annular ledge 23 is formed in the bowl and serves to position a screen 24. Superimposed on this screen is a brace 26 which carries a bearing for the lower extremity of the spiral 27. The tubular casing 28 has screw threaded engagement with the casting 19 and serves to hold the ends of the brace 26 in their proper position.

At 29 I have shown a float which is adapted to travel within the casing 28. This float has a tubular passage formed therethrough, within which is a guide for engaging the spiral 27. Vertical grooves are formed on opposite sides of the casing 28 and are adapted to receive the upwardly extending lugs 31 mounted upon the float 29. These lugs prevent the float from rotating with respect to the casing 28. In order to keep the upper end of the spiral 27 in proper alignment, I have provided a brace 32 which is held in place on the top of the casing 28 by the casting 33. This casting terminates in an upwardly extending pipe 34 bent near its upper end as shown at 36. To this pipe is attached a dial housing 37 which is preferably mounted on a floor board 12 of the car and has a transparent window 38 held in place by a ring 39 which permits the indicator 46 to be viewed. This indicator is secured to a rod 41 by a coiled wire 43, it being of course understood that the rod 41 is secured to the spiral 27.

By viewing Figure 7 it will be noted that I have provided lugs 47 and 48 so that the indicator 46 may point to either for the purpose of indication a full or empty condition of the crank case.

The operation of my device is as follows:—Assuming that the parts are in the position shown in Figures 1 and 2, the placing of oil in the crank case will cause the float 29 to rise as the oil enters through the port 17, pipe 18 filling the casting 19 and the lower portion of the casing 28. This upward movement of the float will impart a rotary movement to the spiral 29 because the float cannot be rotated and further to the fact that the guides in the float cause the spiral to turn as the float rises. This upward movement will in turn be transmitted through the rod 41, coiled wire 43, and will move the indicator 46 in accordance with the movement of the float.

It will thus be seen that I have provided a very simple arrangement whereby the condition of the oil in the crank case may be readily reviewed from the operator's seat.

It is to be understood that the form of my invention herewith shown and described is to be taken as a preferred example of the same, and that various changes in the shape, size and arrangement of parts may be resorted to without departing from the spirit of the invention or the scope of the subjoined claim.

Having thus described my invention, I claim:

In combination with a crank case of an automobile engine, a hollow casting connected to said crank case, the interior of this casting having communication with the interior of said crank case, an indicator housing positioned in the floor of an automobile and adapted to be visible from the driver's seat, indicating means pivoted in said housing, a plurality of vertical grooves formed in the sides of said casting, a float mounted in said casting, lugs formed on said float and adapted to move in said grooves, a spiral rod extending through said float, said float having guide means therein adapted to rotate said rod when said float moves thereover, a vertical rod secured to the upper end of said spiral rod, a coiled wire secured to the upper end of said vertical rod, the opposite end of said wire being attached to said indicating means.

In testimony whereof I affix my signature.

EDWIN HAROLD ROSENBLAD.